July 4, 1939.  F. A. ECOFF  2,164,579
AIR CONDITIONING SYSTEM
Filed Sept. 1, 1936  3 Sheets-Sheet 3
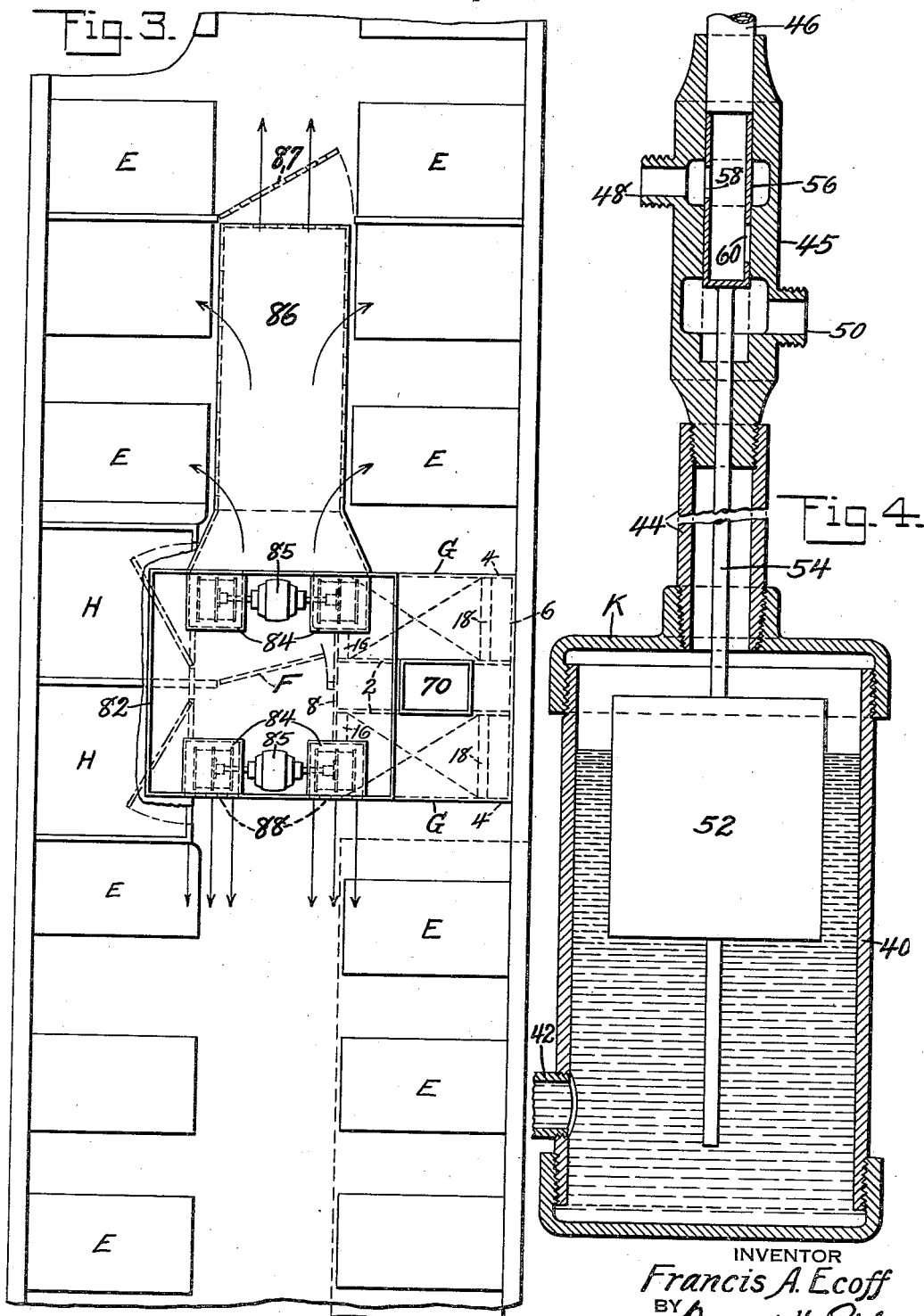
INVENTOR
*Francis A. Ecoff*
BY
ATTORNEY Patented July 4, 1939

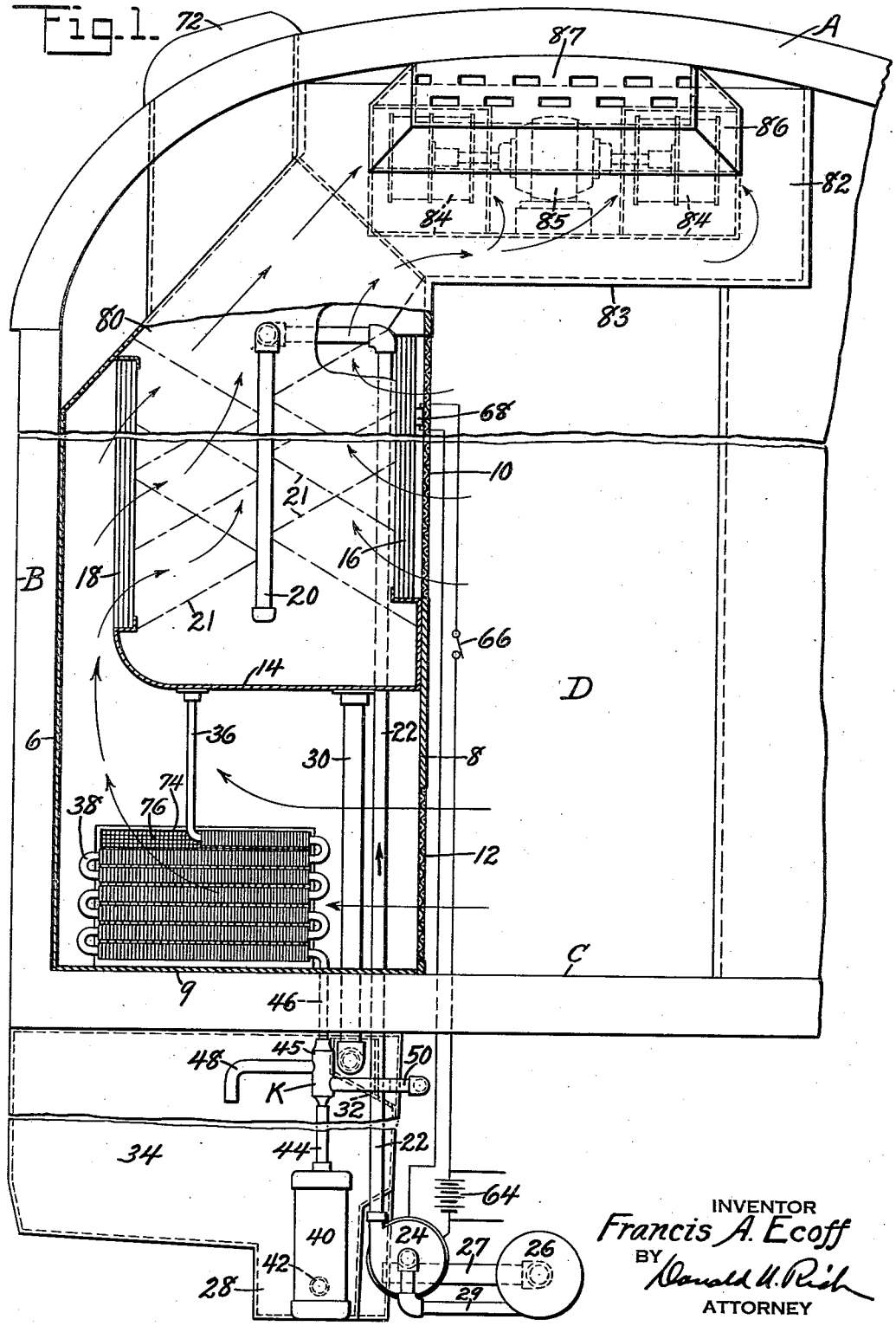

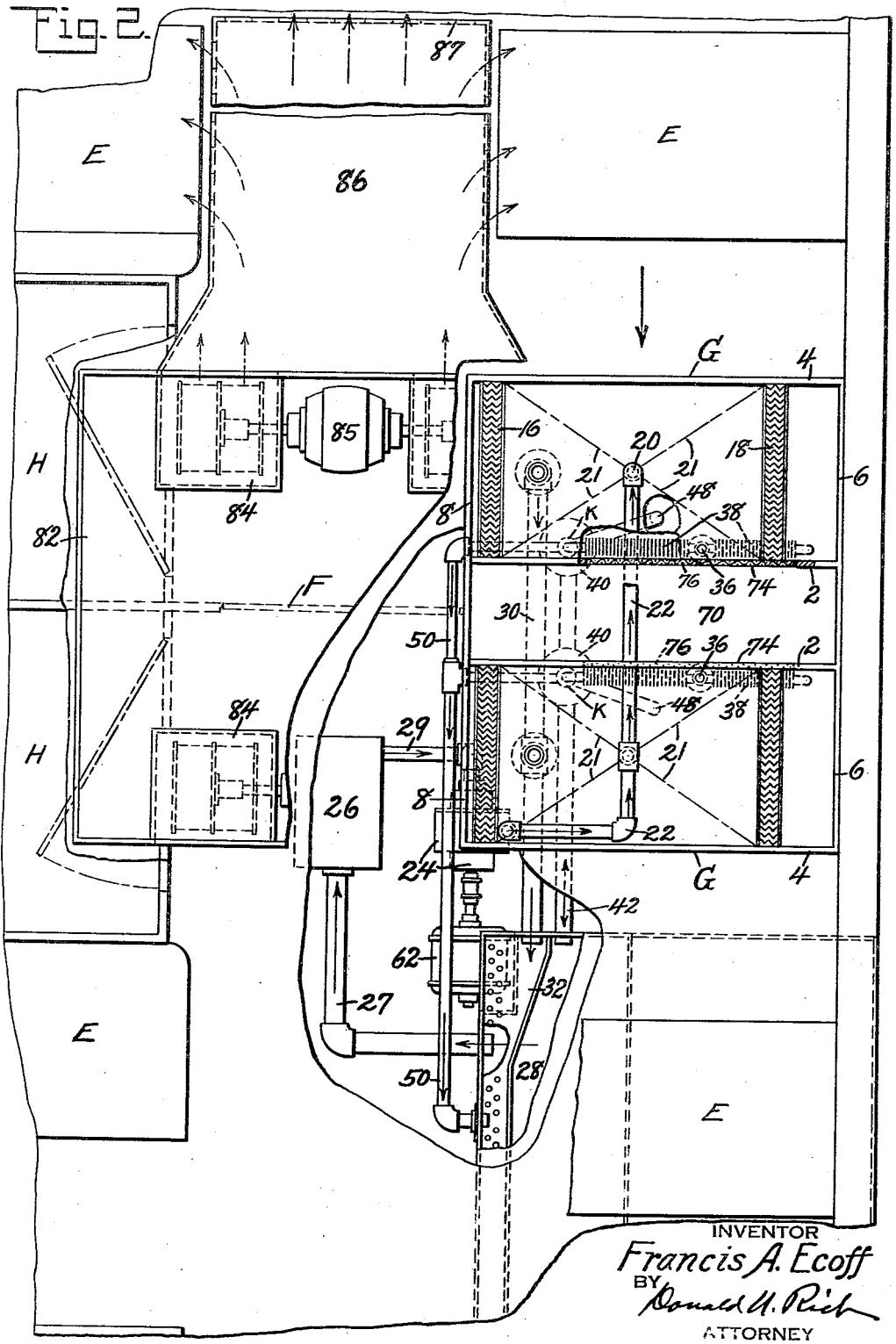

2,164,579

UNITED STATES PATENT OFFICE 2,164,579

AIR CONDITIONING SYSTEM

Francis A. Ecoff, Richmond Heights, Mo., assignor to American Car and Foundry Company, New York, N. Y., a corporation of New Jersey Application September 1, 1936, Serial No. 98,894

9 Claims. (Cl. 62—131)

This invention deals with air conditioning systems in general and in particular with air conditioning systems using water sprays to cool the air for railway vehicles.

Air conditioning systems have been previously constructed wherein the air was cooled by contact with finned coils and continuously recirculated through the coils and the passenger space, but with such systems the air becomes very stale and objectionable since the tendency is to economize by failure to admit sufficient fresh air. One object of the present invention is the provision of a system wherein the air is cooled by washing, thus eliminating the major portion of the odors and providing a system which may be operated at maximum efficiency.

Another object of the invention is the provision of an air conditioning system having means whereby the necessary amount of fresh air admitted is precooled.

A further object of the invention is the provision of a system having a fresh air precooler through which cooling water flows continuously to be intermittently discharged out of the system.

A yet further object of the invention is the provision of an air conditioning system for railway cars wherein the conditioning unit is arranged in a vertical position within the car space in order to be readily accessible.

These and other objects of the invention will be apparent to those skilled in the art from a study of the following description and accompanying drawings in which:

Figure 1 is a transverse sectional view of the system as applied to a railway car;

Fig. 2 is a plan view, partly in section, of the system shown in Fig. 1;

Fig. 3 is a plan view of the system and showing the air flow through the units and car, and Fig. 4 is a detail sectional view of the improved float control device.

Referring now to the drawings in detail, the system is shown as applied to a rail car wherein it is desirable to confine the air in opposite ends of the car to independent circuits as in cars where one end of the car is to be used as a smoker. It is, of course, obvious that the system need not be duplicated as shown, but that a single unit may be used for conditioning the air in a car and that the unit may be placed either at the center or the ends or in a compartment of the car. The system has been shown as applied to a car wherein the air circuits are to be maintained independent but since the units are duplicated like reference characters will be used wherever possible in the following description:

The rail car shown is of the conventional center vestibule type having roof A, sides B, floor C, and vestibule passage D connecting the opposite ends of the car in which are located seats E. The vestibule passage is closed by door F and has the air conditioning units G placed on one side of the passage at either side of the door, while lockers or saloons H are placed on the other side of the passage. Each unit is formed with an outer case having side walls 2 and 4, end walls 6 and 8 and a base 9 and the case may be formed as part of the car or preferably as a removable member. The end wall 8 is provided with an upper screened recirculated air opening 10 and a lower screened recirculated air opening 12, both of which permit the entrance of air into the case from the vestibule. A pan-like member 14 is located between the screened recirculated air openings and divides the casing substantially into two parts, the upper of which forms the air cooling chamber, while the lower forms an air mixing chamber.

Eliminators 16 and 18 extend upwardly from the pan and together with the side walls form what may be considered as an open top box in the center of which is located the spray pipe 20 fitted with nozzles that will direct a spray of water or other liquid as at 21 outward in either direction against the eliminator plates to chill the incoming air flowing through the eliminators. The spray pipe is supplied by cold liquid under pressure through supply pipes 22 by pump 24 which draws the liquid through strainer 26 by means of pipes 27 and 29 direct from the lower portion of a cold liquid sump 28. The water from the sprays drops onto the pan and may flow either through drain 30 to the distributing baffle 32 from which it drops onto the cooling medium such as ice carried in the reservoir or tank 34 carried beneath the car, or it may flow through pipe 36 and precooler 38 for proper disposal by control valve device K.

The control valve device consists of a container 40 connected by pipe 42 to the liquid sump and by short pipe 44 to the distributing valve chamber 45 which is connected to the precooler by pipe 46, to the overflow pipe 48 and to the return pipe 50 which discharges the liquid onto the distributing baffle. Float 52 is located within the container and is connected by rod 54 to an open top cylindrical valve body 56 having side ports 58 and 60 which will permit the flow of liquid from the precooler either through the overflow pipe or through the return pipe or through both, depending upon the position of the float. It is obvious that as the liquid level varies in the reservoir or tank it will also vary in the container and cause a shift in the position of the float and the connected valve body.

The pump previously referred to is driven by a suitable motor 62 supplied by a battery or other source 64 through a circuit having included therein a manual switch 66 and a thermostatic switch 68, with the latter preferably located in the casing adjacent the recirculated air opening 10 as shown.

In the instance shown the units are spaced apart sufficiently to provide a vertical duct 70 through which fresh air may flow from roof inlet 72 to the inlets 74 in the side walls 2 of the casing. The inlets are preferably covered by suitable screens or filters 76 through which the fresh air must flow before passing the precoolers to enter the mixing chamber. In the case a single unit is to be used, it is obvious that a separate duct could be supplied or that the fresh air could be taken through the side walls or even from beneath the car.

The upper end of the casing is connected by suitable duct work 80 to the divided blower housing 82 which in the present instance is located above the ceiling 83 of the passageway. Centrifugal blowers 84 driven by motors 85, the operation of which are controlled by the thermostat through conventional wiring (not shown), are located within the housing and draw the air through the unit for distribution to the car either by short duct 86 having side openings and a grille 87 at the end or by grilled openings 88. It is, of course, obvious that the type of distributing duct or the lack of one does not effect the operation of the system itself.

The operation of the system is as follows: Assuming that the car temperature is such as to necessitate cooling, then the thermostat will operate to start the pump motor and cold liquid will be drawn from the cold sump through the strainer to the pump to be forced through the supply pipe and out of the spray nozzles into contact with the air. The blowers which are operating at all times that the pump is operating will draw air from the vestibule through the eliminator plates against and through the cold spray where its temperature will be lowered, then through the blower chamber to be discharged into the car. In the car the air absorbs heat from the passengers and walls of the car and then is drawn back to the vestibule for rechilling and recirculation. The air entering the lower opening mixes with the fresh air coming through the filter and precooler prior to being drawn through the eliminator 18.

The liquid after giving up a major portion of its chill to the air falls into the pan and the major portion is carried back to the cold sump or reservoir, while a certain part is carried through the precooler to be further warmed by the incoming fresh air. The liquid which flows continuously through the precooler may be discharged from the system or returned to the cold sump dependent upon the position of the float valve. In case the cold sump contains too much liquid, derived either from condensation in the spray chamber or by meltage of the cooling substance such as ice, then the float rises in the container and connects port 58 with the discharge pipe permitting the warm liquid from the precooler to flow out of the system but if the liquid level is low then the float falls and the liquid leaving the precooler flows back to the cold sump through the port 60. Under certain conditions the ports 58 and 60 may partially register with the respective pipes in which case liquid may flow from the precooler through either the overflow or recirculating pipes in the proper proportion to maintain the sump level constant. It is thus seen that the flow of cold liquid through the precooler is substantially constant while the discharge of the liquid from the system may be either intermittent or varying in volume, and is dependent solely upon the liquid level in the cold sump.

The system has been described more or less in detail, but it is to be understood that the description is purely illustrative as various modifications and rearrangements of parts may be made without departing from the scope of the invention as defined by the following claims.

What is claimed is:

1. In an air conditioning system for railway cars, a source of chilled liquid, a casing, a spray pipe in the casing, means for conducting chilled liquid from the source to the pipe for spray discharge within the casing, means for conducting the sprayed liquid from the casing, valve means controlling the flow of the sprayed liquid, said valve means directing the liquid either to the source for recooling or out of the system for discharge, and float means controlling the position of said valve means in accordance with the liquid level at the source.

2. In an air conditioning system for railway cars, a source of chilled liquid, a casing, a spray pipe in the casing, means for conducting chilled liquid from the source to the pipe for spray discharge within the casing, means for conducting the sprayed liquid from the casing back to the source, a discharge connected to said last named means, and valve means controlling the rate of flow of the sprayed liquid only through the discharge in accordance with variations in the liquid level at the source.

3. In an air conditioning system for railway cars, a source of chilled liquid, a casing, a spray pipe in the casing, means for conducting chilled liquid from the source to the pipe for spray discharge within the casing, a precooler coil in said casing, means for conducting sprayed liquid through the precooler and out of the casing, valve means controlling the flow of the sprayed liquid leaving the precooler and casing, said valve means directing the liquid either to the source for re-cooling or out of the system for discharge, and float means controlling the position of said valve means in direct accordance with the liquid level at the source.

4. Air conditioning apparatus comprising, a casing, a horizontal partition substantially dividing said casing, spaced eliminators extending upwardly and cooperating with said partition and casing to form an open topped box, a cold water spray pipe within the box intermediate the eliminators, spray nozzles in said pipe directing the spray upon the eliminators thereby increasing the cooling area, and means to draw air into the box through the eliminators and toward the spray nozzles for discharge out of the open top.

5. Air conditioning apparatus comprising, a casing, a horizontal partition substantially dividing said casing, spaced eliminators extending upwardly and cooperating with said partition and casing to form an open topped box, a spray pipe within the box intermediate the eliminators, spray nozzles in said pipe directed toward the eliminators and means to draw air into the box through the eliminators and toward the spray nozzles for discharge out of the open top, a precooler in the casing below the partition, and drain means connecting the precooler to the space above the partition.

6. In an air conditioning system, a reservoir holding a chilled liquid, an air conditioning chamber having a spray pipe therein, means for conducting chilled liquid from the reservoir to said pipe for spray discharge into said chamber, drain means for returning liquid from the chamber to the reservoir, means for discharging liquid out of the system, and valve means operative in response to variations in liquid level in said reservoir for actuating the valve means, the latter being so formed as to control discharge of liquid out of the system.

7. In an air conditioning system, a reservoir holding a chilled liquid, an air conditioning chamber having a spray pipe therein, means for conducting chilled liquid from the reservoir to said pipe for spray discharge into said chamber, drain means for returning liquid from the chamber to the reservoir, means for discharging liquid out of the system, and valve means operative in response to variations in liquid level in said reservoir for actuating the valve means, the latter being so formed as to control discharge of liquid out of the system and also to control return of liquid to the reservoir.

8. In an air conditioning system, a reservoir holding a chilled liquid, an air conditioning chamber provided with a spray pipe, means for conducting chilled liquid from the reservoir to the spray pipe for spray discharge into said chamber, drain means for returning liquid from the chamber to the reservoir, a precooler adjacent the air conditioning chamber and receiving liquid from said chamber, means for returning liquid from the precooler to the reservoir, means connected with said return means for discharging liquid out of the system, and valve means in said return means operable in response to variations in liquid level in said reservoir for controlling discharge of liquid out of the system and return of liquid into said reservoir.

9. In an air conditioning system, a chamber holding water ice, a cabinet, means in said cabinet dividing the latter into an air mixing chamber and an air conditioning chamber, a cooling coil in the air mixing chamber, a spray pipe in the air conditioning chamber, means for conducting water from the ice chamber to the spray pipe for spray discharge into the air conditioning chamber, drain means for returning the sprayed water to the ice chamber, means for returning sprayed water from the air conditioning chamber through the precooler to said ice chamber, a pipe for discharging sprayed water out of the system, said pipe being connected with said return means, and a valve in said return means operable in response to variations in liquid level in the ice chamber for controlling passage of liquid through the return means into the ice chamber and out of the system.

FRANCIS A. ECOFF.